(12) United States Patent
Van Den Brink et al.

(10) Patent No.: US 6,328,125 B1
(45) Date of Patent: Dec. 11, 2001

(54) TILTING VEHICLE

(75) Inventors: Christopher Ralph Van Den Brink, Puttershoek; Hendrik Marinus Kroonen, Zwijndrecht, both of (NL)

(73) Assignee: Brinks Westmaas B.V., 's-Gravendeel (NL)

( * ) Notice: Subject to any disclaimer, the term of this patent is extended or adjusted under 35 U.S.C. 154(b) by 0 days.

(21) Appl. No.: 09/508,770

(22) PCT Filed: Sep. 16, 1998

(86) PCT No.: PCT/NL98/00534

§ 371 Date: Mar. 16, 2000

§ 102(e) Date: Mar. 16, 2000

(87) PCT Pub. No.: WO99/14099

PCT Pub. Date: Mar. 25, 1999

(30) Foreign Application Priority Data

Sep. 16, 1997 (NL) .................................................. 1007045

(51) Int. Cl.[7] .............................. B62D 61/08; B62D 9/02
(52) U.S. Cl. ..................................... 180/211; 280/124.103; 280/93.51
(58) Field of Search ..................... 180/211; 280/124.103, 280/93.502, 93.51

(56) References Cited

U.S. PATENT DOCUMENTS 5,927,424 * 7/1999 Brink et al. ........................... 180/216

FOREIGN PATENT DOCUMENTS

WO 95/34459 12/1995 (WO) .

* cited by examiner

Primary Examiner—Paul N. Dickson
(74) Attorney, Agent, or Firm—Young & Thompson (57) ABSTRACT

The invention relates to a vehicle (1) provided with a frame (2) having a front frame part (3) and a rear frame part (4) which can tilt with respect to one another. The vehicle (1) comprises three or more wheels (7, 7', 13), it being possible to rotate the front wheel (13) with respect to the steering column (18). In this case, a sensor (24) determines the angle of rotation between the front wheel (13) and the steering column (18) and, as a function of this angle of rotation, actuates the tilting means (9, 9') of the vehicle. As a result of the consequent tilting of the front frame part (3) and as a consequence of the speed at which the vehicle (1) is travelling, the front wheel (13) and the tilting angle will automatically adopt the correct level for allowing the vehicle (1) to travel through the bend in a stable manner at the given speed. Controlling the tilt via the difference in angular rotation between the steering column (18), which is flexibly connected to the front wheel (13), and the front wheel (13), it is possible to control the tilt in a simple and robust manner.

23 Claims, 8 Drawing Sheets

TILTING VEHICLE

BACKGROUND OF THE INVENTION

The invention relates to a vehicle provided with
at least three wheels,
a frame comprising a first frame part and a second frame part, it being possible for the frame parts to tilt with respect to one another about a tilting axis which lies in the longitudinal direction,
at least one front wheel which is connected to the first frame part and can tilt about a front-wheel steering axle which lies essentially parallel to the plane of the front wheel,
a steering wheel which is rotatably connected to the first frame part,
tilting means which are connected to the first and second frame parts for executing a tilting movement between the first and second frame parts, and
a sensor which is coupled to the front wheel and to the tilting means for forming a control signal for driving the tilting means.

A vehicle of this kind is known from WO95/34459 in the name of the applicant. This document describes a self-balancing, preferably three-wheeled vehicle, in which the sensor, which in this case is formed by a hydraulic rotary valve, measures the force or the moment on the front wheel. In response to the signal from the sensor, the front frame part, which comprises the driver's cab and the steering wheel, is tilted until the moment on the front wheel is virtually equal to zero. In this way, a self-stabilizing tilting action is obtained, which causes the vehicle to corner in a stable manner at all speeds. Since narrow vehicles as described in WO95/34459 generally have insufficient lateral stability and manoeuvrability to be able to participate in normal (automotive) traffic, a tilting system of this nature increases the stability, in such a manner that a narrow vehicle of this nature can become a fully functioning means of transport. The tilting system described is fully automatic, with the result that the driver does not require any special skills to control the vehicle. The known system provides a vehicle which reacts safely and predictably in all conceivable driving conditions.

Although the known tilting vehicle is very effective, the force sensor for determining the force or the moment on the front wheel is relatively complex. Furthermore, the feel of the steering of the known device can be improved further.

SUMMARY OF THE INVENTION

Therefore, the object of the present invention is to provide a tilting vehicle which comprises a simple and robust control of the tilting action, combined with an optimum feel of the steering for the driver.

To this end, the vehicle according to the present invention is characterized in that the steering wheel is connected, via a steering axle, to the first frame part, which steering axle can rotate about its axis with respect to the front-wheel steering axle, the sensor determining the angle of rotation between the front-wheel steering axle and the steering axle.

The present invention is based on the insight that a vehicle, which may be a tilting vehicle, can be steered in two fundamentally different ways:

Firstly, the driver may have direct control over the position of the front wheel or the front wheels. The driver, by imparting a specific angular displacement to the front wheel, provides the vehicle with a turning radius.

Secondly, the driver may have direct or indirect control over the tilting position of the vehicle. In this case, the combination of the vehicle speed and the tilting position provides a specific turning radius. The front wheel assumes an appropriate position which is governed by the speed and the tilting position, which front-wheel position is not used to determine the direction of travel. A motorcycle works on this principle. By means of complex steering manoeuvres, the driver continuously adjusts the tilting position, resulting in the desired direction of travel. In practice, this has been found to provide a vehicle which is easy to control. In the case of the vehicle according to the invention, the driver can fix the tilting position directly by means of the tilting means, in contrast to the indirect fixing of the tilting position via the handlebars, as takes place in the case of a motorcycle. According to the invention, the optimum instrument allowing the driver to control and actuate the tilting system comprising the tilting means, and therefore to adjust the tilting position, is the steering wheel. According to the invention, the standard rigid connection between the steering wheel and the front wheel is replaced by a connection in which the steering axle can rotate about its axis with respect to the front-wheel steering axle. This flexible connection, in which the rotation-angle sensor is accommodated, provides a signal for the desired tilting position of the vehicle. The tilting of the vehicle can then be actuated The optimum position of the front wheel, which is appropriate for the combination of tilting angle and speed of travel, is automatically adopted in a manner which is imperceptible to the driver.

The tilting system according to the present invention allows the sensor to be of very simple design and also allows the tilting means to be actuated in a robust and operationally reliable manner.

The sensor, the control arrangement and the tilting means themselves may each separately use various technological principles, for example they may be of mechanical, hydraulic, pneumatic or electrical design. The present invention will provide a description of a (largely) hydraulic design of the components. In this case, the rotation-angle sensor may comprise a cylinder which is connected at a first end to the front wheel and at the second end to the steering column. The tilting means may comprise hydraulic or pneumatic cylinders which, via a valve, are connected to a pressure source. The cylinder of the angle-position sensor actuates the valve of the tilting means. This valve may be a simple on/off slide valve.

The vehicle according to the present invention may comprise a rear frame part provided with two wheels and a front frame part which has one wheel and can tilt with respect to the rear frame part. It is also possible to use a rear tiltable frame part provided with one wheel and an untiltable front frame part with two wheels. Finally, it is also possible to employ a tiltable frame structure as described in Dutch patent application number 1005894 in the name of the applicant.

EP-A-0,592,377 has disclosed a tilting vehicle in which the tilting of the front frame part with respect to the rear frame part, which supports the drive, is obtained by the angular displacement of the front wheel about the front-wheel steering axle with respect to the frame, the steering wheel and the front wheel being rigidly connected. A system of this nature has the drawback that the tilting is not dependent on the vehicle speed and is therefore not accurate. A stable ride is therefore not obtained.

EP-A-0,020,835 has disclosed a tilting vehicle in which the tilting position can be obtained by actuating foot pedals or by moving the steering column, transversely to its axis of rotation. The steering axle is again rigidly connected to the front wheel. In this known device, the tilting position is not dependent on the vehicle speed, so that a stable ride is not obtained.

The way in which the vehicle according to the present invention operates differs fundamentally from the way in which the vehicles which are known from the prior art and have been described above operate. When the driver of the vehicle according to the invention is driving straight on a flat road surface and wants to turn a corner, he rotates the steering wheel. Since the geometry and gyroscopic stability of the front wheel mean that the latter tends to remain directed straight on, the steering angle of the steering axle as dictated by the driver will lead to an angular displacement a between the front-wheel steering axle and the steering axle. On the basis of this angular displacement α, the rotation-angle sensor forms a control signal which leads to the tilting means being driven and to a predetermined tilting angle β of the first frame part. As the tilting of the vehicle increases, the front wheel will steer in slightly at an angle δ, which is dependent on the speed of travel. If the steering wheel is then held at a fixed angle φ, the angular displacement of the steering wheel is partially converted into a tilting angle and partially into an angular displacement of the front wheel about the front-wheel steering axle. This tilting angle and the angle of the front wheel automatically assume the ideal ratio which is suitable for any speed of travel.

By adjusting the ratio between the tilting angle β of the vehicle and the angle α detected by the sensor, it is possible to influence the ride. By way of example, it would be possible to provide a 1:1 coupling, in which case x° rotation of the steering wheel with respect to the front wheel leads to x° of tilting.

In a further embodiment, a steering sensation is obtained by connecting a force element to the steering column, which force element, as the angle position of the steering column increases, exerts an increasing restoring force on the steering column. This force feedback, under which a moment builds up on the steering wheel as the steering wheel is rotated further, produces a steering sensation and, when the steering wheel is released, returns the vehicle to the upright position. Since the tilting angle of the vehicle is a measure of the speed at which the vehicle drives through a bend, and owing to the fact that this tilting angle is related to the angle determined by the sensor between the steering axle and the front-wheel steering axle, this angle can therefore be used as a measure for the level of counter-moment exerted on the driver. It is therefore possible to achieve successful feedback from the "sharpness of the corner" to "the amount of force which is exerted on the steering wheel". As the force element, it is possible, by way of example, to place a torsion spring between the front-wheel steering axle and the steering axle (force as a function of α). This spring may also be accommodated between the steering wheel and the front frame part (force as a function of steering wheel angle φ).

In a further embodiment, the vehicle comprises a speed sensor which, at a predetermined limit speed, limits the angular displacement between the front-wheel steering axle and the steering axle. At low speeds, when the vehicle is at a standstill or when it is reversing, it is important that the tilting of the vehicle is switched off. This is achieved by limiting the angular displacement between steering axle and front-wheel steering axle. In one embodiment, this is realized by switching on a power-steering cylinder, which is accommodated between the front wheel and the frame, at low speeds. If the power-steering moment is controlled as a function of the speed, it is possible to achieve an excellent, smooth transition from "power steering without tilting" when at a standstill and reversing to "no power steering, with complete tilting" when driving normally. In the transition range, the situation is that of "slight power steering with slight tilting".

It is also possible, for a vehicle in which power steering is not required or desired, to block the tilting at low speeds by locking the angular displacement between front-wheel steering axle and steering axle in the centre position. In the design being examined here, there is a fixed/hydraulic coupling between the tilting angle β and the angular displacement ac between front-wheel steering axle and steering axle. In an embodiment of this nature, it is possible to select the option of blocking the tilting angle, with the result that the vehicle stands reliably upright and the angular displacement between front-wheel steering axle and steering axle is blocked.

BRIEF DESCRIPTION OF THE DRAWINGS

One embodiment of a tilting vehicle according to the present invention will be explained in more detail with reference to the appended drawing, in which.

DESCRIPTION OF THE PREFERRED EMBODIMENTS

Figure 1:
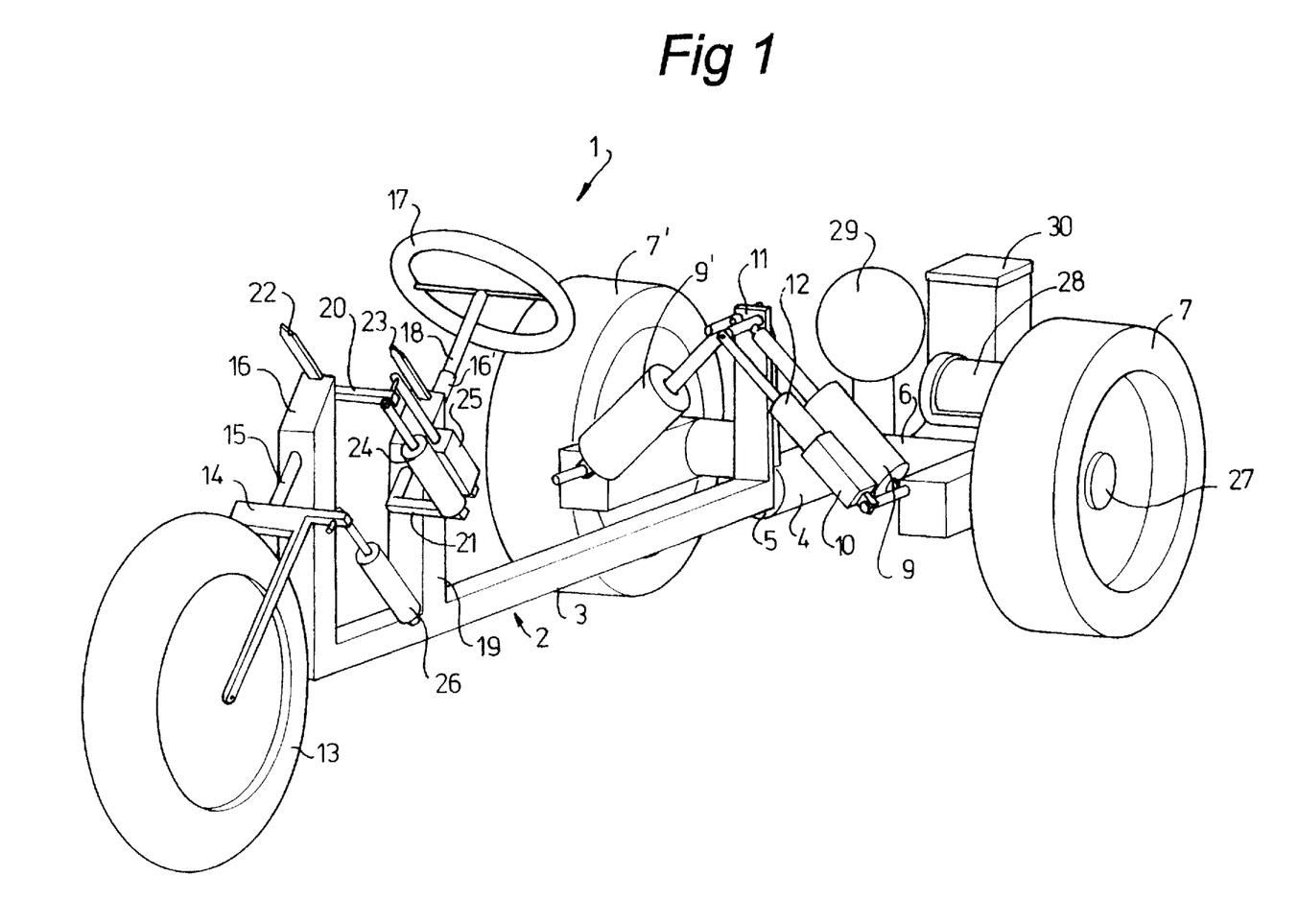
FIG. 1 shows a diagrammatic, perspective view of a vehicle according to the present invention in the straight-on driving position, with a rotation-angle sensor which is of hydraulic design.

FIG. 1 shows a vehicle 1 with a frame 2. The frame 2 comprises a front frame part 3 and a rear frame pan 4. The frame parts 3 and 4 are attached at a rotation point 5 so that they can rotate with respect to one another. The rear frame part 4 is provided with a rear axle 6 with two rear wheels 7, 7'. Via a piston rod, tilting cylinders 9, 9' are connected to an attachment plate 11 on the front frame part 3. At a second end, the cylinders 9, 9' are connected to the rear frame part 4. A slide valve 10, which is driven by a cylinder 12, is attached, parallel to the tilting cylinder 9, between the rear frame part 4 and the front frame part 3. The rear frame part 4 bears further drive means, such as an internal combustion engine or electric motor, for propelling the vehicle. For the sake of clarity, this drive is not shown in the figures.

The front frame part 3 bears the front wheel 13 which, via the front fork 14 and the front-wheel steering axle 15, is rotatably mounted in a front support 16. A steering wheel 17 is attached, via the steering axle 18, to a second support 19 of the front frame part 3. Via the steering wheel 17, the steering axle 18 can be rotated in the bearing provided by the second support 19, independently of the front wheel 13. A force-exerting device, such as a torsion spring 16', is connected, on the one hand, to the steering axle 18 and, on the other hand, to the front frame part 3, in order to exert a restoring force on the steering wheel 17, which force increases as the angular displacement of the steering wheel 17 increases.

Respective transverse arms 20 and 21 are attached to the end of the front-wheel steering axle 15 and of the steering axle 18, the free ends of which arms are connected to a respective part of the rotation-angle sensor 24, which in the embodiment shown is formed by a hydraulic cylinder. In FIG. 1, the rotation angles of the front wheel 13 and of the steering wheel 17 are shown by diagrammatic rotation-angle indicators 22 and 23 which are purely for the purpose of illustration and will not be present in the final design of a vehicle according to the invention. A power-steering valve 25, the respective ends of which are attached to the transverse arms 20 and 21, is accommodated parallel to the rotation-angle sensor 24.

Finally, the front fork 14 is attached, via a transverse arm, to a power-steering cylinder 26, the other end of which is attached to the front frame part 3.

The front frame part 3 also supports a driver's seat and driver's cab which, for the sake of clarity, are omitted from the figure shown.

The rear frame part 4 furthermore comprises an oil pump 28, an accumulator 29 and a reservoir 30 for the hydraulic pressure medium. The tilting cylinders 9 and 9' and the power-steering cylinder 26 are driven by the oil pump 28. Finally, a speed sensor 27 is connected to the rear axle 6 for switching the power-steering cylinder 26 on and off as a function of the speed.

In the straight-on position shown in accordance with FIG. 1, the angle $\alpha$ between the steering axle 18 and the front-wheel steering axle 15 is 0°, so that the rotation-angle indicators 22 and 23 are parallel to one another. The rotation-angle sensor 24 and the cylinder 12 of the slide valve 10 are hydraulically coupled together. Movement of sensor 24 ensures movement of slave cylinder 12, with the result that slide valve 10 moves. As a result, the slide valve 10 opens, a pressure difference is formed across the tilting cylinders 9, 9' and the tilting frame 3 begins to move. As a result, slide valve 10 returns to its centre position, and when this position is reached the pressure difference between 9, 9' disappears, so that the tilting movement stops. Each position of the rotation-angle sensor 24 leads to a specific position of cylinder 12 and therefore of the tilting frame 3. The slight rotation of the front wheel will scarcely be noticed by the driver and will be corrected unnoticed by a small correction to the steering wheel.

Figure 2:
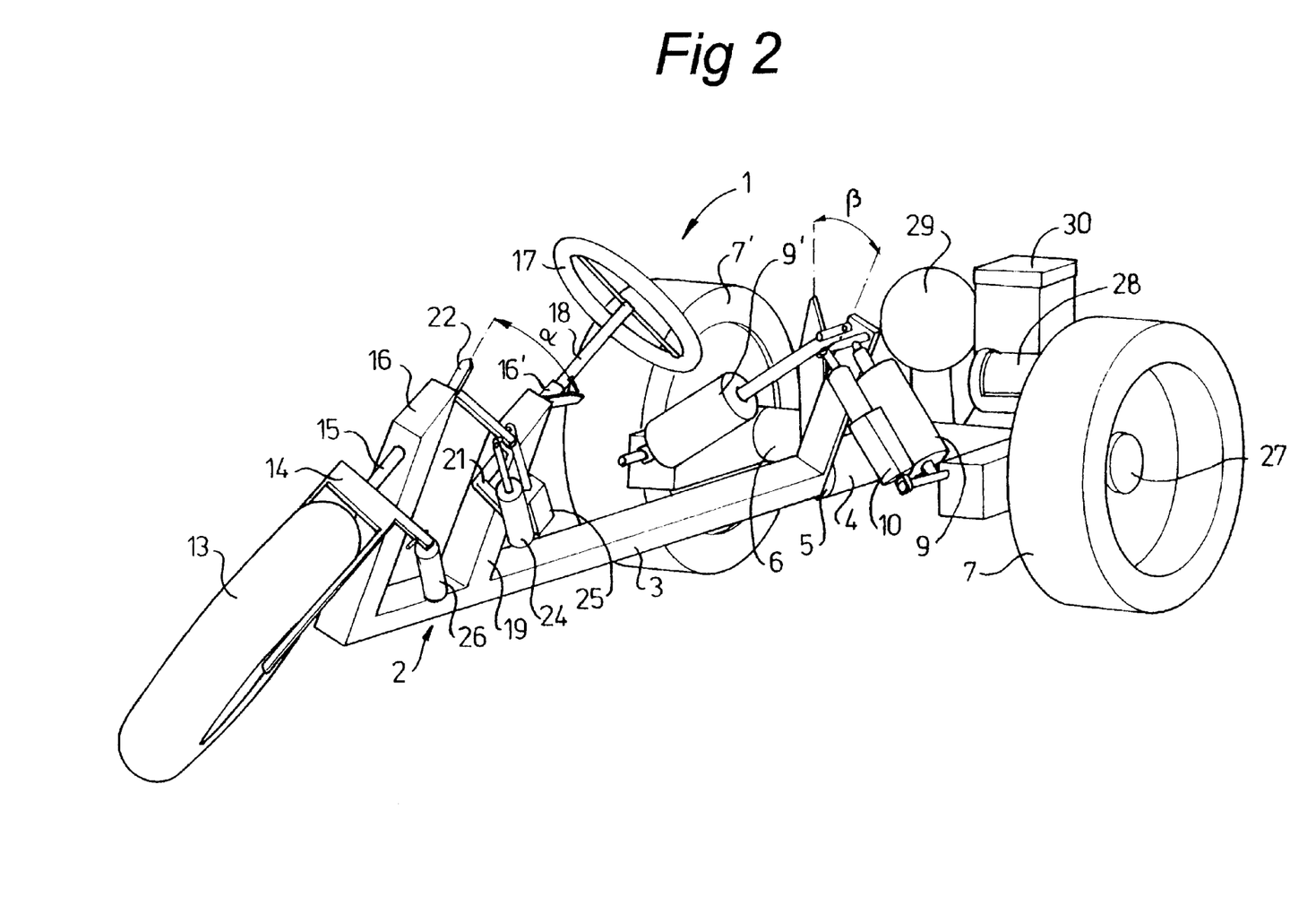
FIG. 2 shows a perspective illustration of the vehicle in accordance with FIG. 1, in the tilted position.

When the steering wheel 17 is rotated out of the straight-on position until the rotation-angle indicator 23 is at an angle to the rotation-angle indicator 22, the inertia and other dynamic properties of the front wheel 13 cause the rotation-angle indicator 22 initially to remain in the straight-on position. Tilting cylinders 9, 9' are actuated by means of the rotation-angle sensor 24, so that the front frame part 3 tilts to a predetermined extent with respect to the rear frame part 4. As the front frame part 3 tilts, the front wheel 13 will steer in slightly, depending on the vehicle speed, until an angle $\alpha$ is established between the front wheel 13 and the steering wheel 17, as indicated in FIG. 2. The tilting angle between the front frame part 3 and the rear frame part 4 will ultimately amount to $\beta°$. In FIG. 2, $\alpha$ is defined by the diagrammatic rotation-angle indicators 22 and 23. Thus the angular displacement of the steering wheel 17 is converted partly into the tilting angle $\beta$ and partly into a front-wheel angle, which both adopt the ideal ratio during any speed of travel.

The value $\alpha$ measured by the rotation-angle sensor 24 is equal to the steering angle of the steering axle 18 minus the angular displacement of the front-wheel steering axle 15.

The angle $\alpha$ is used to control the tilting angle $\beta$ of the vehicle in accordance with the relationship $\beta=f(\alpha)$. The tilting angle $\beta$ is entirely defined by the steering wheel measurement $\alpha$. Both the travel of the steering wheel 17 with respect to the front wheel 13 (the extent in degrees of the steering wheel measurement $\alpha$) and the conversion of the steering wheel measurement $\alpha$ into the tilting angle $\beta$ can be selected in such a manner that an optimum ride is obtained. By way of example, it is possible to select $\beta=c.\alpha$ where c is a constant.

Figure 3:
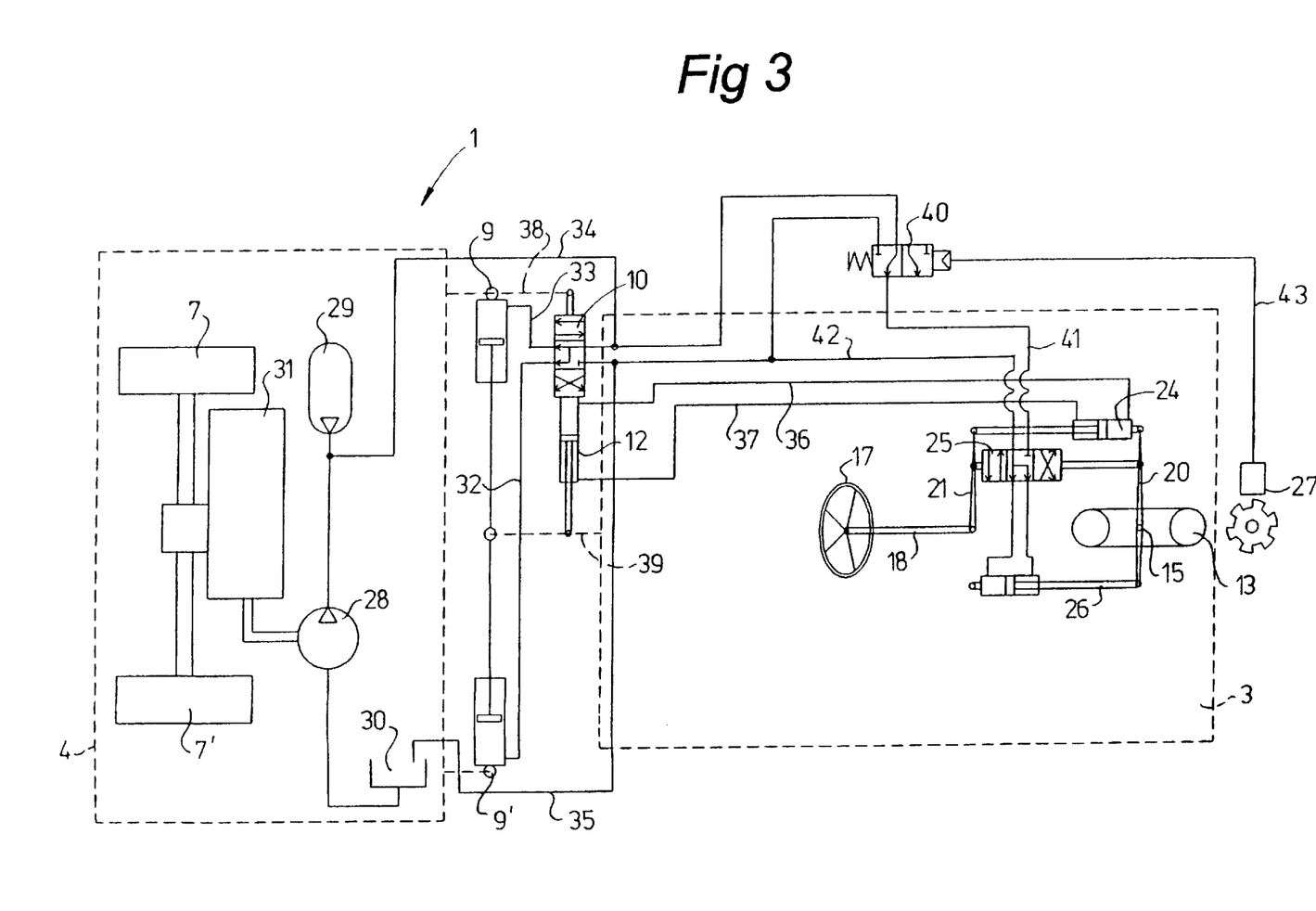
FIG. 3 shows a hydraulic circuit diagram of the vehicle in accordance with FIG. 1 and FIG. 2.

FIG. 3 diagrammatically shows the hydraulic system of the vehicle 1 according to the present invention. In FIG. 3, the front frame part 3 and the rear frame part 4 are indicated by the rectangles denoted by a dashed line. Furthermore, in FIG. 3 the same reference numerals denote the same components as in FIGS. 1 and 2. As can be seen from FIG. 3, the oil pump 28 is driven by the engine 31 of the vehicle 1. In this case, the engine 31 may be an electric motor or an internal combustion engine. However, it is also possible to drive the oil pump 28 by means of a separate motor which is accommodated in the front frame part 3.

The accumulator 29 is situated on the delivery side of the oil pump 28. Via the 4/3 slide valve 10, the tilting cylinders 9, 9' can be connected, by way of their respective lines 32, 33, to the high-pressure line 34 which is in communication with the accumulator 29 or to the return line 35 which opens out into the reservoir 30. The slide valve 10 is actuated by the cylinder 12 which, via the lines 36 and 37, is coupled to the rotation-angle sensor 24. The cylinder 24 is connected, on the one hand, to the transverse arm 20 of the front-wheel steering axle 15, while the piston rod of the cylinder 24 is connected to the transverse arm 21 of the steering axle 18. The piston of the cylinder 24 is moved as a function of the relative angular displacement a between the steering axle 18 and the front-wheel steering axle 15. This travel is followed by the cylinder 12. In the straight-on position shown, in which the angle $\alpha$ is 0°, both tilting cylinders 9, 9' are connected to the high-pressure line 34, so that the front frame part 3 is upright. In the event of the steering wheel being moved anticlockwise (as seen from the driver's position), the piston will move to the left inside the cylinder 24. As a result, the piston in the cylinder 12 is pushed towards the valve 10 and the right-hand tilting cylinder 9' is connected to the high-pressure line 34. The left-hand tilting cylinder 9 is connected to the return line 35. The valve 10 and the cylinder 12 are connected, on the one hand, to the rear frame part 4, as is diagrammatically illustrated by the dashed line 38, and, on the other hand, are connected to the front frame part 3, diagrammatically indicated by the dashed line 39. As a result, when tilting to the left, the cylinder 12 is moved away from the valve 10, until the valve 10 resumes the centre position, with the result that the movement of the coupled-together piston rods of the tilting cylinders 9, 9' stops.

FIG. 3 also shows the speed-dependent power steering by means of the power-steering cylinder 26 which, via the 4/3 power-steering valve 25, is connected to a switching valve 40. The switching valve 40 is actuated by a speed sensor 27, for example in the form of a geared pump. In the situation shown, the speed of the vehicle 1 is insufficient for the pump 27 to move the valve 40 counter to the spring force. At the low speed, the valve 40 is switched in such a position that the line 41 of the valve 25 is connected to high-pressure line 34. The line 42 is always connected to the return line 35. In the event of the steering wheel being rotated, the fact that the valve 25 opens means that the pressure difference will be built up across the piston of the cylinder 26, so that the front wheel 13 is rotated. In the event of the vehicle speed increasing, the pressure in the switching line 43 will increase to a sufficient extent to switch the position of the valve 40, so that both lines 41 and 42 are connected to the return line 35. The power steering can be switched off smoothly by not switching line 41 over abruptly from high pressure to return line, but rather by allowing the pressure to drop gradually (for example by means of a pressure-control valve which is actuated by the speed sensor). In this way, the power-steering cylinder 26 is deactivated. By switching on the power steering at low speeds, in the event of the steering wheel 17 being rotated the front wheel 13 will follow the steering-wheel movements, so that the angle α remains virtually equal to 0°. This prevents the vehicle from tilting. A certain free travel of α, for example ±1°, remains possible.

Although in the embodiments described above the sensor 24 is of hydraulic design, the invention is not limited to this arrangement, and it is also possible to use optical, electrical or mechanical sensors for actuating the tilting cylinders. In principle, it is also possible to replace the hydraulics of the tilting cylinders with any other system, such as for example an electrical system. Furthermore, the present invention is not limited to vehicles which have a front tilting part with one wheel and a rear stationary part with two wheels, but rather it is possible for the front frame part to comprise two wheels and to be of non-tilting design, while the rear frame part is able to tilt and comprises one wheel. In this case, the terms "front wheel" and "front-wheel steering axle" also encompass the designs in which these components, if desired, are located in the rear part, with regard to the direction of travel, of the vehicle. "Front wheel" therefore means the steerable wheel of the vehicle and "front-wheel steering axle" means the axle about which the steerable wheel can tilt. Furthermore, it is possible to use a four-wheeled frame, as described in Dutch patent application number 1005894 in the name of the applicant.

In alternative embodiments, it is possible for the angle of rotation α between the steering axle 18 and the front-wheel steering axle 15 to be transmitted to the slide valve by two traction cables or by a push/pull cable, instead of via a hydraulic rotation-angle sensor 24, lines 36 and 37 and the slave cylinder 12 of the slide valve 10. The angular displacement between the steering axle 18 and the front-wheel steering axle 15 can also be measured by means of a planetary gear system, in which case, by way of example, the sun gear is connected to the steering axle 18 and the planetary gear is connected to the front-wheel steering axle 15, the rotation of the planet gear providing the tilting angle required. The coupling of the planet-gear rotation to the tilting cylinders can be brought about via various technological principles.

Figure 4:
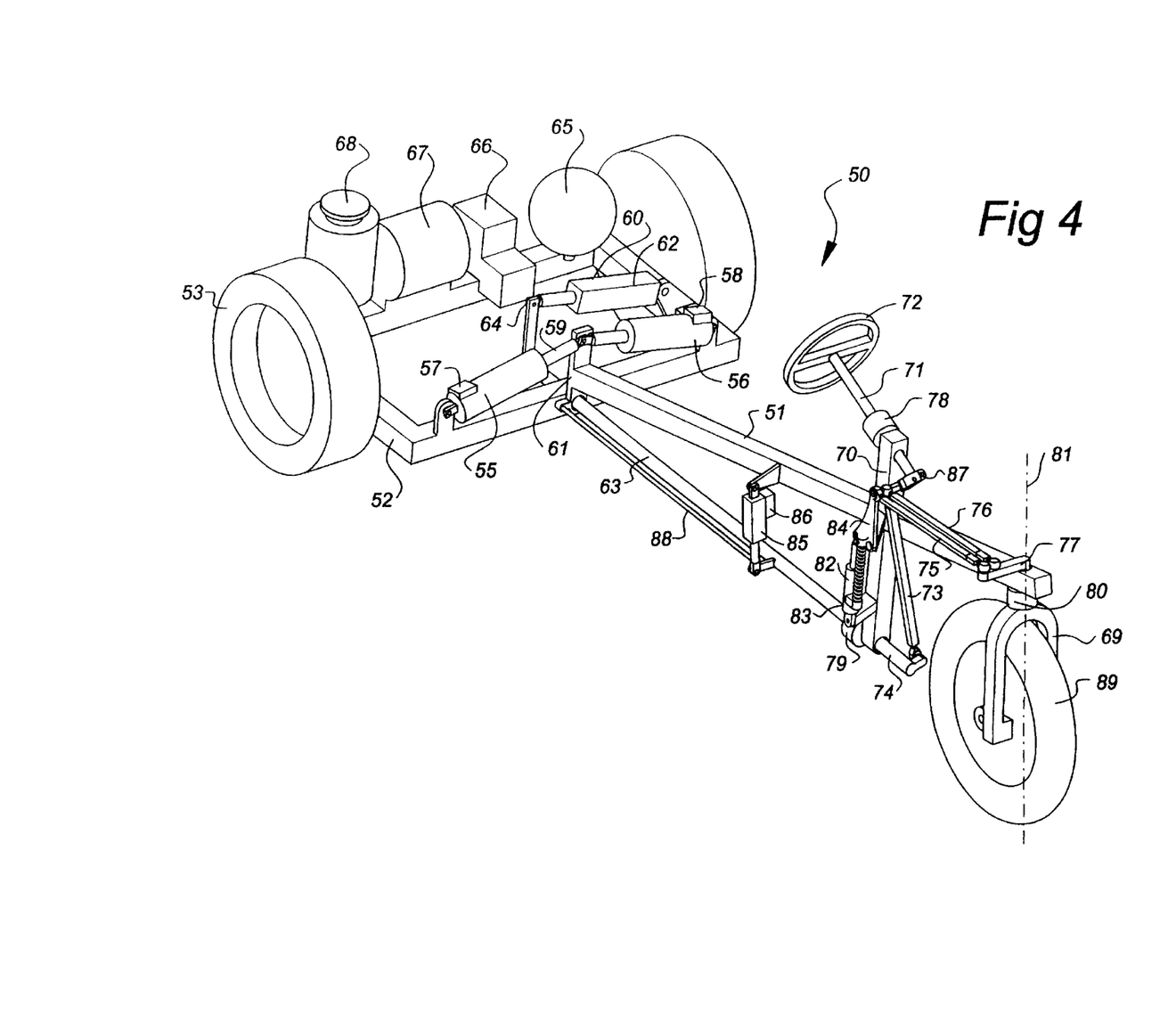
FIG. 4 shows a perspective view of a vehicle in which the rotation-angle sensor is formed by a set of bars.

In the embodiment which is illustrated in detail in FIG. 4, the difference in angle between the rotation of the front wheel 89 about front-wheel steering axle 81 and the rotation of the steering wheel 72 about the steering axle 71 is determined via a set of bars, which set of bars is mechanically coupled to the slide valve 62 via a rotary shaft 63 and a flange 64. The tilting vehicle 50 in accordance with FIG. 4 comprises a front frame part 51 which is tiltably connected to a rear frame part 52. The rear frame part 52 is provided with two rear wheels 53 and 54 and comprises two tilting cylinders 55, 56. The tilting cylinders 55, 56, on the one hand, are connected by means of their cylinder housing to the frame part 52 and, by means of their piston rods 59, 60, are connected to an attachment plate 61 on the front frame part 51. The rotary shaft 63 extends rotatably as far as the region of the rear frame part 52 and, at the location of this rear frame part 52, is connected to the slide valve 62 via a flange 64. At the other end, the slide valve 62 is connected to the rear frame part 52. Furthermore, the rear frame part 52 comprises an engine, not shown, as well as an emergency accumulator 65, an accumulator charging pump 66, a volume sensor 66' (not shown), an oil pump with integrated volume control 67 and a reservoir 68 of a continuous circulation system. The cylinders 55 and 56 are each provided with a respective shock absorber/restrictor valve 57, 58.

At the front end of the front frame part 51, the front fork 69 is suspended so that it can rotate about the front-wheel steering axle 81, via a transmission 80.

Via the steering axle 71, the steering wheel 72 is rotatably mounted in the top part of the front support 70. The bottom part of the support 70 comprises a bearing in which the front end 74 of the rotary shaft 63 is accommodated. Via the swivel bracket 87, the steering axle 71 is connected to a horizontal arm 76 which engages pivotably on the transverse arm 77 of the front wheel 89. The swivel bracket 87 is connected, via a ball joint, to a vertical arm 73, which, via a ball joint, is connected to the front end 74 of the rotary shaft 63. With the aid of the swivel bracket 87, the horizontal arm 76 and the vertical arm 73, the difference in rotation angle between steering axle 71 and of the front wheel 89 about the front-wheel steering axle 81 is converted into a rotation of the rotary shaft 63 about its longitudinal direction. Via the flange 64, this rotation is transmitted to the slide valve 62 which actuates the tilting cylinders 55, 56 in order to tilt the front frame part 51 as a function of the rotation-angle difference detected by the bars 87, 73 and 76.

Furthermore, the vehicle 51 comprises a power-steering cylinder 82, which, on the one hand, is connected to the front support 70 and, on the other hand, engages on a tilting plate 84. Via the power-steering on 75, which runs parallel to the horizontal arm 76 of the rotation-angle sensor, when the power-steering cylinder is actuated the transverse arm 77 is moved from the front wheel 89. The power-steering cylinder 82 is actuated by a power-steering valve 85 which is connected, on the one hand, to the front frame part 51 and, on the other hand, to the rotary shaft 63. For the sake of clarity, the system of hydraulic lines between the power-steering valve 85 and the power-steering cylinder 82 is omitted in FIG. 4. Furthermore, an overflow valve 86 is provided, which is actuated by a speed sensor of the vehicle, so that at low speeds the power-steering valve 85 actuates the power-steering cylinder 82, and at high speeds it is not possible for pressure to build up across the power-steering cylinder via the valve 85. Finally, a torsion bar 88 is provided which, as a function of the tilting position, exerts a force on the rotary shaft 63, ensuring that as the position of the vehicle becomes more inclined it is necessary to exert more steering force on the steering wheel 72. When the steering wheel 72 is released, the torsion bar 88 ensures that the front frame part 51 moves back into the upright position.

Figure 5:
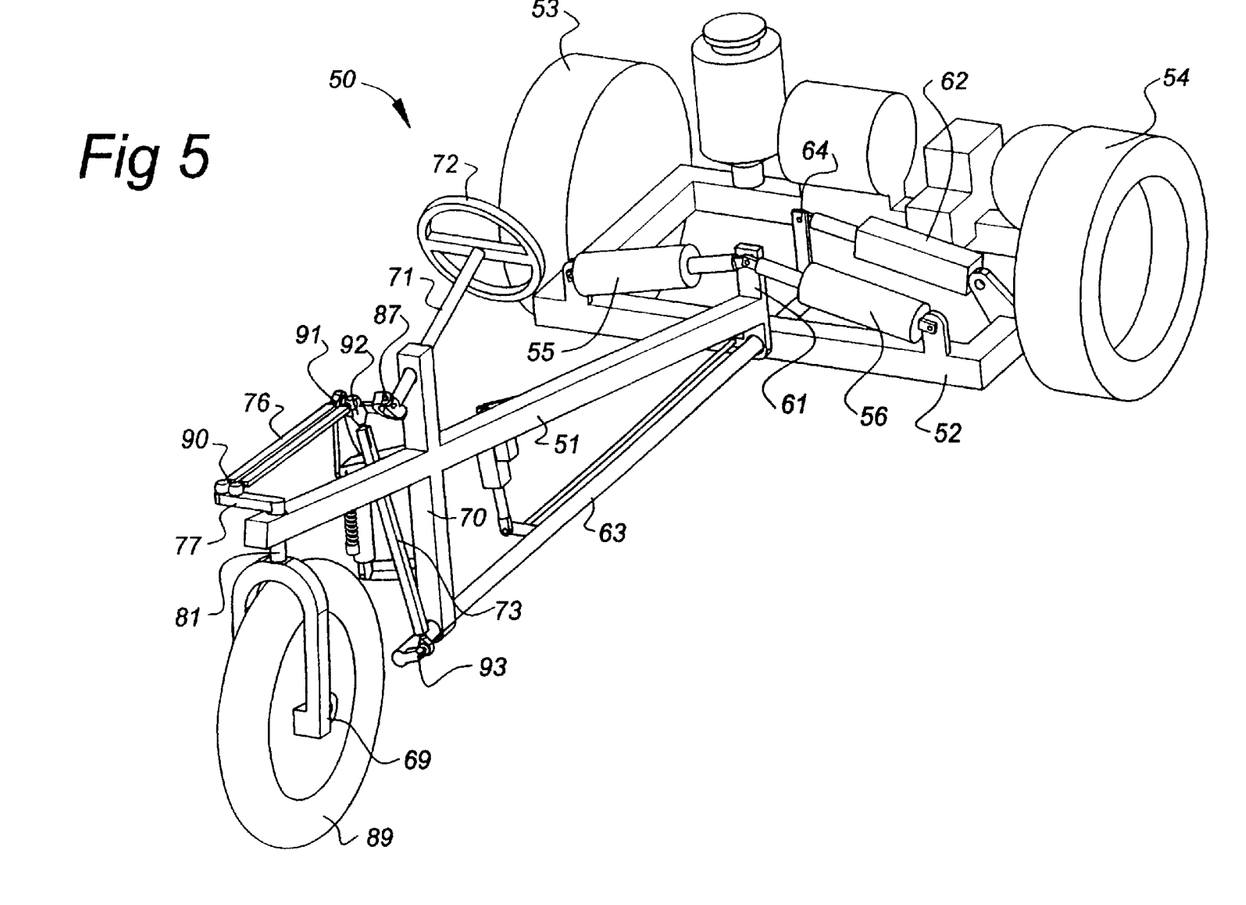
FIGS. 5 to 7 show a perspective view of the vehicle in accordance with FIG. 4 in various tilted positions.
Figure 6:
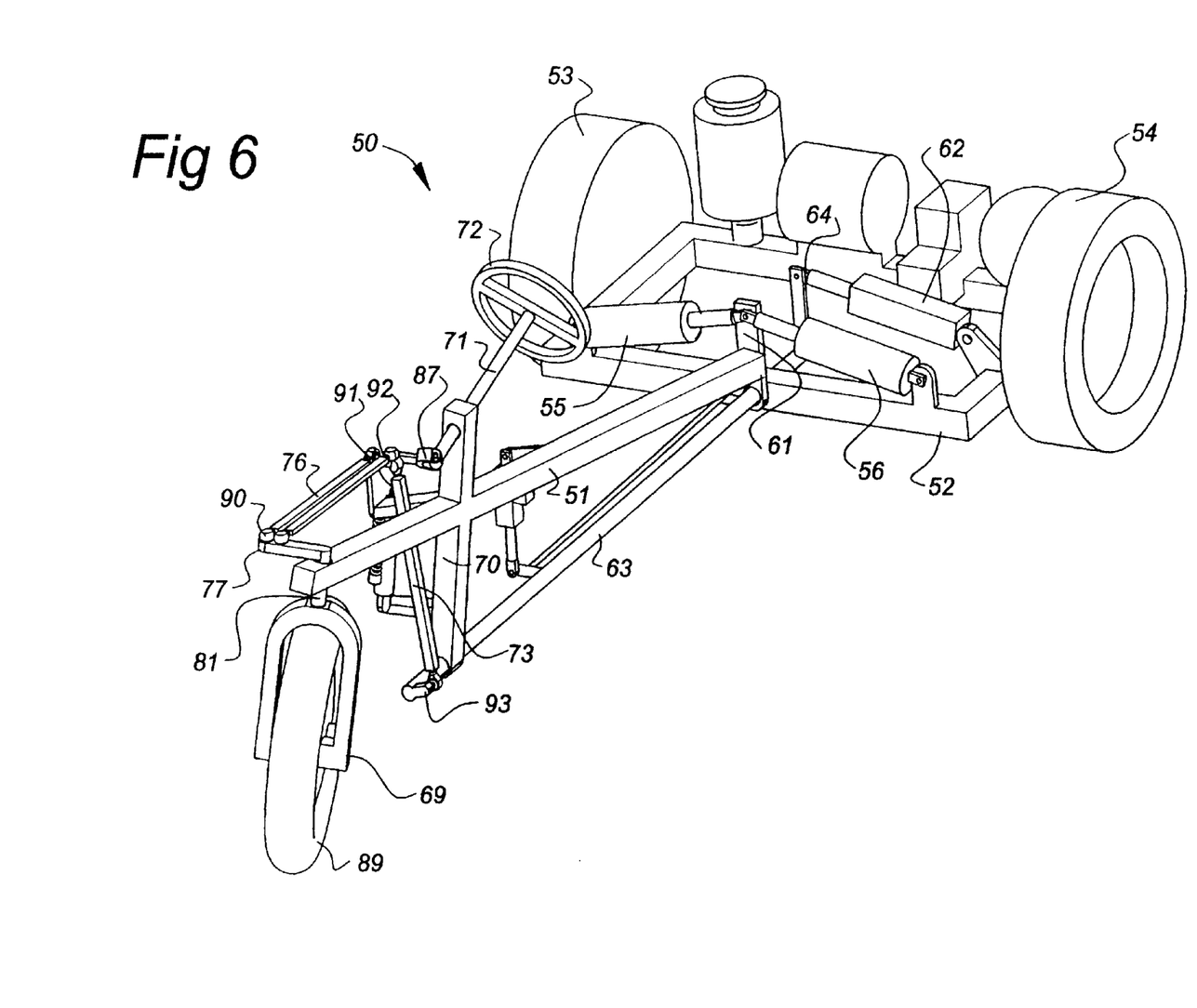
Figure 7:
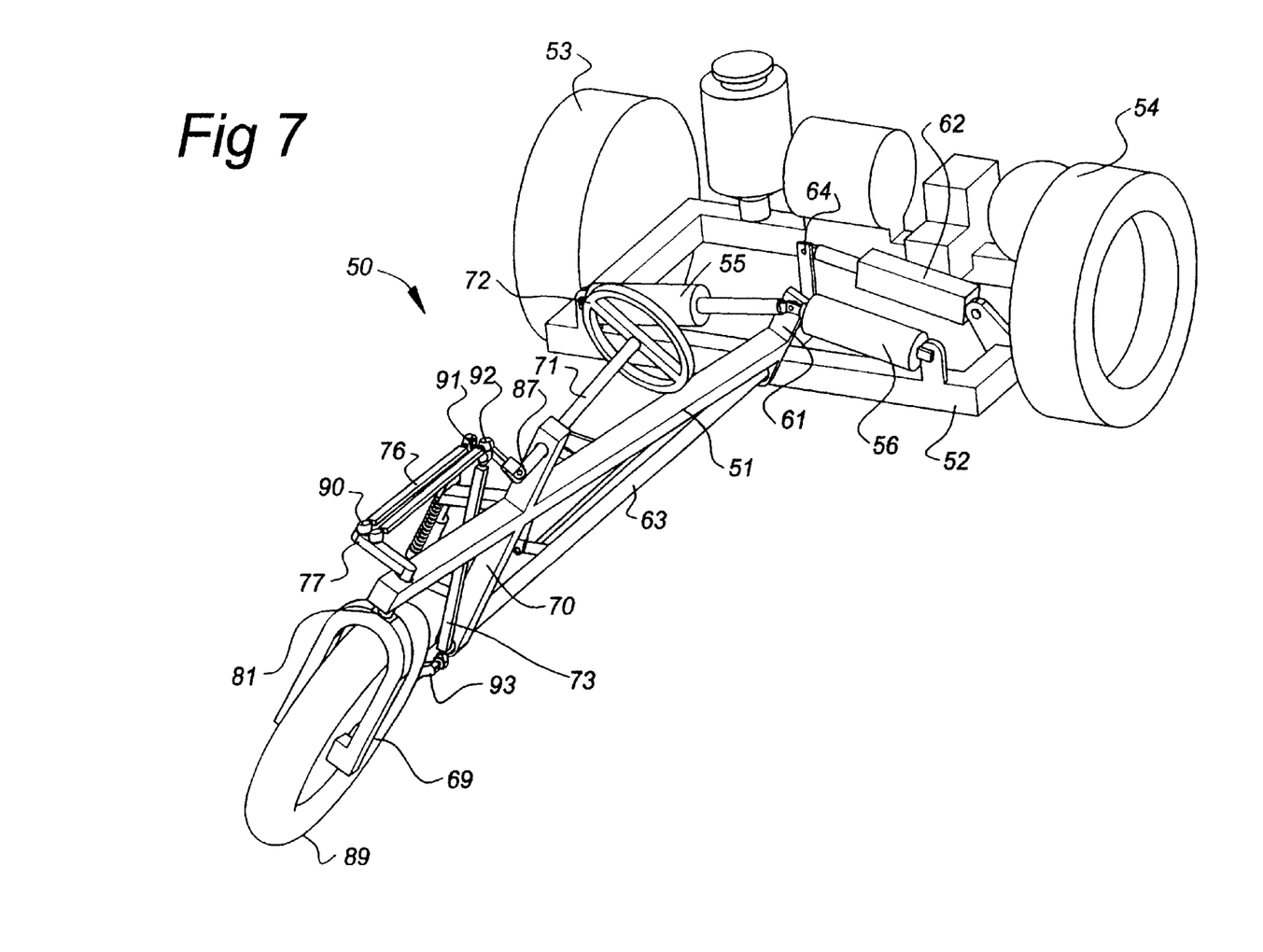

FIG. 5 shows the tilting vehicle 51 in accordance with FIG. 1 in the upright position, and in this figure the position of the vertical arm 73, the horizontal arm 76 and of the swivel bracket 86, which is connected to the steering axle 71, can be seen more clearly. As is clearly apparent, the vertical arm 73 is connected, via ball joints 92 and 93, on the one hand to the swivel bracket 87 and on the other hand to the rotary shaft 63. Via a ball joint 91, the horizontal arm 76 is connected to the swivel bracket 87 and, by means of a ball joint 90, is connected to the transverse arm 77. As is clear from FIG. 6, when the steering wheel is rotated to the left, either the horizontal arm 76 can be moved forwards or the vertical arm 73 can be moved upwards, or a combination of these two movements can take place. As a result of the horizontal arm 76 moving forwards, the front wheel will turn to the left. Moving vertical arm 73 upwards imparts a rotation to the rotary shaft 63 via the ball joint 93, so that the rotary shaft actuates the slide valve 62 via the flange 64. As a result, the piston rod 60 is withdrawn into the housing of the tilting cylinder 56 and piston rod 59 is pushed out of the tilting cylinder 55, so that the front frame part 51 is tilted, via the attachment plate 61, to the position which is illustrated in FIG. 7. The rotary shaft 63 can be seen as an extension, towards the front of the tilting vehicle, of the slide valve 62. Since this slide valve 62 has a very short working travel, the rotary shaft 63 can also be regarded as an extension of the rear frame part 52. The rotation of the rotary shaft 63 with respect to the front frame part 51 is consequently equal to the tilting angle β between the front frame part 51 and the rear frame part 52. Via the link formed by the vertical arm 73 and the swivel bracket 87, the rotation of the steering axle 71, horizontal arm 76 is converted either into a rotation of the front-wheel steering axle 81, via the horizontal arm 76, or into a rotation of the rotary shaft 63, via the vertical arm 73, or a combination of these two rotations. The combination of the rotation of the front wheel 89 about the front-wheel steering axle 81 and of the tilting of the front frame part 51 will be adjusted by the vehicle itself as a function of the speed of travel and turning radius.

Figure 8:
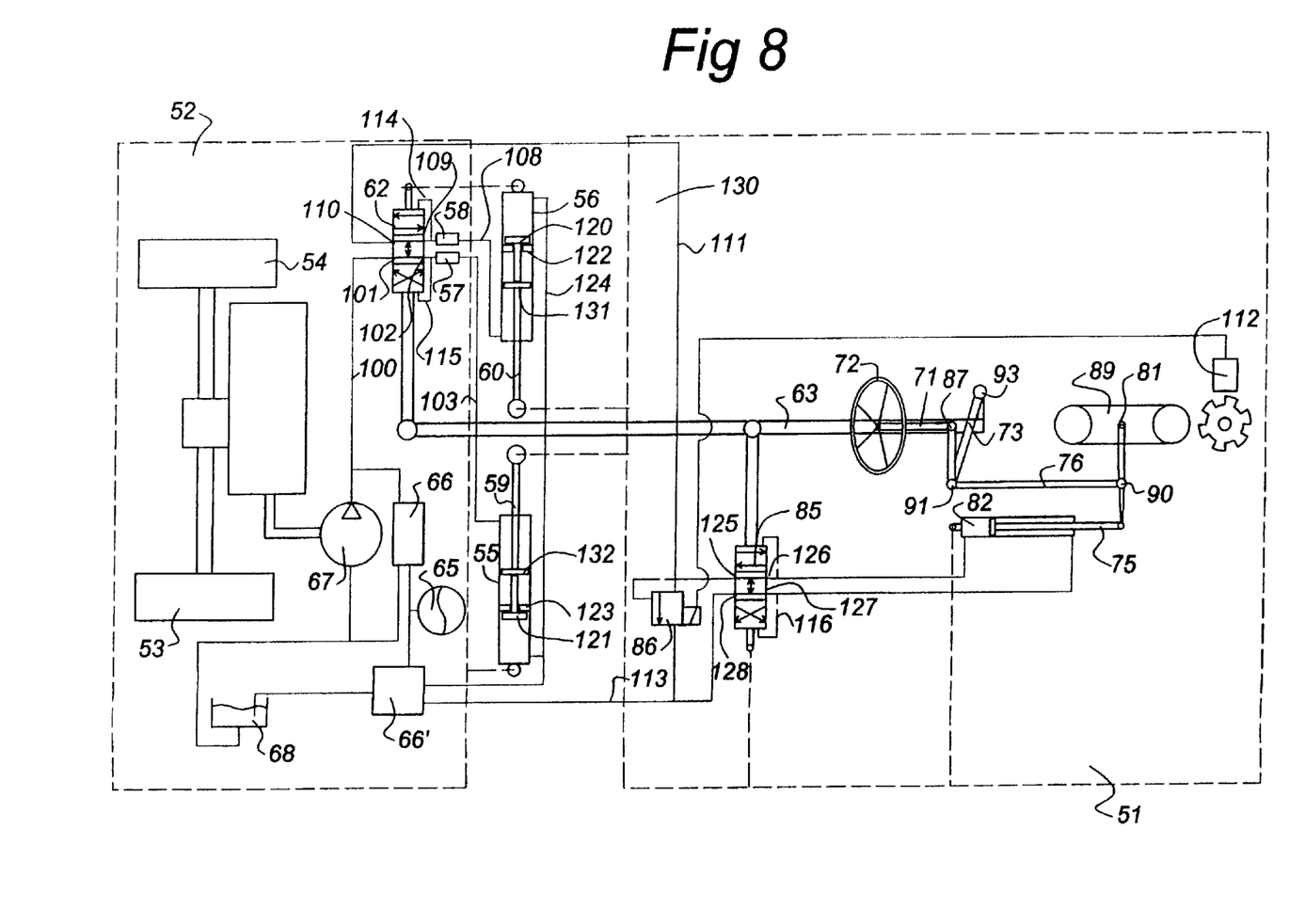
FIG. 8 shows a hydraulic circuit diagram of the vehicle in accordance with FIGS. 4 to 7.

FIG. 8 shows the hydraulic circuit diagram for controlling the tilting of the tilting vehicle 50 in accordance with FIGS. 4 to 7. The system in accordance with FIG. 8 is a constant circulation volume system, in contrast to the constant pressure system which is shown in FIG. 3. The oil pump 67 is equipped with an integrated constant-volume regulator and, at high speeds, pumps a constant volume through the circuit 130 which includes the slide valve 62, the overflow valve 86 and the reservoir 68, and at low speeds pumps a constant volume through the circuit formed by the slide valve 62, the power-steering valve 85 and the reservoir 68.

Via a high-pressure line 100, the oil pump 67 is connected to a supply inlet 101 of the slide valve 62. A cylinder outlet 102 of the slide valve 62 is connected, via a shock absorber 57 and outgoing line 103, to the tilting cylinder 55. A return inlet 109 of the valve 62 is connected, via a shock absorber 58 and a return line 108, to the tilting cylinder 56. A return outlet 110 of the valve 62 is connected, via the line 111, both to the inlet of the overflow valve 86 and to the supply inlet 125 of the power-steering valve 85. The discharge line from the overflow valve 86 and the return outlet 128 of the power-steering valve 85 are connected, via line 113 and volume sensor 66', to the reservoir 68 which lies on the low-pressure side of the pump 67.

A speed sensor 112, which if appropriate may be designed as an oil pump, generates an electrical control signal which is transmitted to the overflow valve 86, in such a manner that, at high vehicle speeds, this overflow valve is switched over and connects the line 111 to the line 113, so that there can be no pressure buildup across the power-steering valve 85 and the power steering is deactivated.

The mechanical connections between the slide valve 62 and the tilting cylinders 55, 56 and the mechanical connection between the pistons 59, 60 and the rear frame part are indicated by dashed lines. The same applies to the mechanical connection between the power-steering cylinder 82 and the power-steering valve 85 and the front frame part.

If the valve 62 is situated in the centre position, the hydraulic fluid flows directly from the supply inlet 101 to the return inlet 110. If, at high vehicle speeds, under which line 111 and line 113 are connected, the slide valve 62 is actuated, via the rotary shaft 63, by the rotation of the steering wheel 72, in the event of the steering wheel being rotated to the left, as seen from the driver's position, the outgoing line 103 of the tilting cylinder 55 will be increasingly connected to the low-pressure line 111, while the return line 108 of the tilting cylinder 56 will be increasingly connected to the high-pressure line 100. As a result, the piston rod 59 will be pushed out of the cylinder housing of the tilting cylinder 55, while the piston rod 60 will be retracted into the cylinder housing of the tilting cylinder 56. As a result, the front frame part 51 of the tilting vehicle tilts to the left.

Via feedback lines 114 and 115, the outgoing line 103 and the return line 108 are connected to respective sides of the slide valve 62. As a result, a force which acts in the opposite direction to the steering force and is coupled back to the latter is generated on surfaces in the valve. Thus, if it is necessary to generate more pressure, more force has to be applied to the slide valve 62. As a result of the counter-moment applied to the rotary shaft 63 in this way, a force which is a measure of the tilting acceleration which is perceived by the driver is imparted to the person controlling the steering wheel 72. The result is a favourable steering sensation. By providing the restrictor valves 57, 58, the actuation of the tilting cylinders 55, 56 is damped, so that the feedback of the supply outlet 102 and return inlet 109, via feedback lines 114, 115, generates a counter-force on rotary shaft 63 which is a measure of the tilting speed which is perceived by the driver on the steering wheel 72. The slide valve 62 could be replaced by a rotary valve, in which case the feedback is effected by means of a hydraulic motor.

If the vehicle speed decreases, the overflow valve 86, via the sensor 112 is moved into the position as shown in FIG. 8, so that a pressure difference is built up across the overflow valve 86. As a result, increasing amounts of oil have to flow through the power-steering valve 85, with the result that pressure can be built up in the power-steering cylinder 82 if the valve 85 is activated. In the same way as slide valve 62, the power-steering valve 85 is provided with a supply inlet 125, a supply outlet 126, a return inlet 127 and a return outlet 128, as well as with a feedback line 116. Since the tilting of the front frame part 51 is adjusted, via the rotary shaft 63 and the slide valve 62, on the basis of the difference between the rotation of the steering axle 71 and the rotation of the front wheel 89 about the front-wheel steering axle 81, when the power-steering cylinder 82 is fully active the tilting of the vehicle will be switched off. As a result of the power-steering cylinder 82 being activated, the front wheel 89 is rotated about the front-wheel steering axle 81 (for example to an extent equivalent to the angular displacement of the steering axle 71) and the steering input will not cause any rotation of the rotary shaft 63. As a result, the vehicle remains in the upright position at low speeds.

Another option for blocking the tilting of the vehicle at low speeds is, by means of the feedback line 116, to place the power-steering valve 85 very much in the centre position, so that the valve cannot be moved by rotating the steering wheel, so that all that happens is that the front wheel 89 can be rotated about the front-wheel steering axle 81 without the vehicle being tilted. As a result of this feedback in the power-steering valve 85, the advantage is obtained that the driver feels some of the forces which are acting on the front-wheel steering axle 81. In FIG. 8, there is a certain degree of feedback across the power-steering valve 85, so that as the vehicle speed decreases the rotation of the rotary shaft 63 by means of the power-steering valve 85 is increasingly blocked and the stiffness of the upright position increases.

As shown in FIG. 8, each cylinder 55, 56 comprises, in addition to pistons 131, 132, an emergency piston 120, 121 which can move separately from the pistons 131, 132. In the event of a failure in the hydraulic system, for example in the event of the oil pump 67 breaking down, a volume sensor 66' detects a fall in volume, and the emergency pistons 120, 121 are connected, via an emergency line 124, to the emergency pressure accumulator 65 which is held under pressure via a pump valve 66. As a result, the emergency pistons 120, 121 are pushed against respective internal stops 122, 123 into the position which is shown in FIG. 8, so that the front tilting frame 51 is placed in the upright position.

Other possibilities for an emergency system for placing the vehicle in the upright position in the event of the hydraulic system failing are, for example, the arrangement of a spring element parallel to the tilting cylinders 55, 56 and allowing the tilting to take place counter to the spring force. If the hydraulic tilting force disappears, the spring force will move the vehicle into the upright position.

For a hydraulic system which acts at constant pressure as shown in FIG. 3, the pressure can be measured using a sensor and, in the event of a certain pressure drop, emergency pistons of similar type to the emergency pistons shown in FIG. 8 can be activated.

In order to improve the steering sensation, it has already been described above that feeding back the pressure across the slide valve 62, via feedback lines 114, 115, results in the person controlling the steering feeling a force on the steering wheel 72 which is a measure of the tilting acceleration. By applying a traditional damping action via the restrictor valves 57, 58, the force felt on the steering wheel 72 is converted into a measure of the tilting speed of the front frame part 51.

As a result of the action of the torsion bar 88 as shown in FIG. 4, as the tilting increases, the force which has to be exerted on the steering wheel 72 to tilt the vehicle increases and, when the steering wheel 72 is released, the vehicle returns to the upright position.

Acceleration or deceleration transmissions 78, 80, 79 can be arranged in the steering axle 71, in the front-wheel steering axle 81 and in the bearing of the rotary shaft 63, in order to change the steering sensation. Together with the selection of the lengths of arms 73, 76 and of the swivel bracket 87, the relationship between the steering angle, the rotation of the front wheel 89 about the front-wheel steering axle 81 and the tilting angle can be adjusted.

If the suspension of the front wheel 89 is fitted with a large fork head angle (the tilting axle 81 forming an angle to the vertical), geometric properties mean that at low speeds the tilting angle of the front frame part 51 is not optimum. This behaviour can be eliminated by imparting an opposing turning moment when the front wheel is rotated about the front-wheel steering axle 81, by means of a force-exerting element which, by way of example, may be designed as a tension/compression spring 83 which is accommodated between the front frame part 51 and the front-wheel steering axle 81.

What is claimed is:
1. Vehicle (1, 50) provided with
   at least three wheels (7, 7'; 13; 53, 54, 89),
   a frame comprising a first frame part (3, 51) and a second frame part (4, 52), the frame parts being adapted to tilt with respect to one another about a tilting axis which lies in the longitudinal direction,
   at least one front wheel (13, 89) which is connected to the first frame part (3, 51) and can tilt about a front-wheel steering axle (15, 81) which lies essentially parallel to the plane of the front wheel,
   a steering wheel (17, 72) which is rotatably connected to the first frame part (3, 51), via a steering axle (18, 71)
   tilting means (9, 9'; 55, 56) which are connected to the first and second frame parts (3, 51, 4, 52) for executing a tilting movement between the first and second frame parts, and
   a sensor (24; 63, 73, 76, 87) which is coupled to the front wheel (13, 89) and to the tilting means (9, 9'; 55, 56) for forming a control signal for driving the tilting means (9, 9'; 55, 56),
   wherein the steering axle (18, 71) can rotate with respect to the front-wheel steering axle (15,81); the sensor (24; 63, 73, 76, 87) determining the angle of rotation between the front-wheel steering axle (15, 81) and the steering axle (18, 71), and
   wherein the sensor comprises a cylinder which, by means of a first end, is connected to the front wheel and, by means of a second end, is connected to the steering axle.

2. Vehicle (1) according to claim 1, characterized in that the tilting means (9, 9') comprise hydraulic or pneumatic cylinders which, via a valve (10), are connected to a pressure source (29), the cylinder of the sensor (24) actuating the valve (10).

3. Vehicle (1) according to claim 2, characterized in that the valve (10) is an on/off slide valve.

4. Vehicle (1, 50) according to claim 1, the sensor (24; 63, 73, 76, 87) being designed in such a manner that the tilting angle (β) between the first and second frame parts is proportional to the angle (α) between the front wheel (13, 89) and the steering axle (18, 71).

5. Vehicle (1, 50) according to claim 1, characterized in that a force element (16, 88) is connected to the steering axle (18, 71), which force element (16, 88), as the angle of rotation of the steering axle (18, 71) increases, exerts an increasing restoring force on the steering axle.

6. Vehicle (1, 50) according to claim 5, wherein the force element (16, 88) comprises a torsion element attached between the front wheel (13, 89) and the steering wheel (17, 72) and/or between the steering wheel (17, 72) and the first frame part (3, 51).

7. Vehicle (1, 50) according to claim 1, characterized in that the vehicle comprises a speed sensor (27, 112) which, at a predetermined limit speed, limits the angular displacement between the front wheel (13, 89) and the steering wheel (17, 72).

8. Vehicle (1, 50) according to claim 7, comprising a power-steering cylinder (26, 82) which is connected to the front wheel (13, 89) and to the steering axle (18, 71), which power-steering cylinder (26, 82) is switched on by the speed sensor (27, 112) at below the limit speed.

9. Vehicle (1, 50) according to claim 8, characterized in that the power-steering cylinder (26, 82), in the switched-on state, imparts to the front-wheel steering axle (15, 81) an angular displacement which is such that the sensor (24; 63, 73, 76, 87) does not register any angle of rotation.

10. Vehicle (1, 50) according to claim 8, characterized in that the force of the power steering moment of the power-steering cylinder (26, 82) is controlled as a function of the speed.

11. Vehicle (1, 50) according to claim 1, characterized in that the first and second frame parts (3, 4; 51, 52) lie in line with one another in the longitudinal direction.

12. Vehicle (1, 50) according to claim 11, characterized in that the rear frame part (4, 52) comprises at least two rear wheels (7, 7'; 53, 54) which are connected to the rear frame part (4, 52).

13. Vehicle (50) according to claim 1, further comprising emergency tilting members (120, 121, 122, 123) which, in the event of a fault in the tilting action, place the first frame part (51) in an upright position.

14. Vehicle (50) according to claim 13, wherein the tilting means (55, 56) comprises a piston rod (59, 60) with, at one end, a tilting piston (131, 132) and, at a distance therefrom, an emergency piston (120, 121), which can move independently of the tilting piston (131, 132), with an internal stop (122, 123) between the two pistons (120, 131; 121, 132), and an emergency pressure source (65) for pressing the emergency piston (120, 121) against the stop (122, 123) in the event of a fault.

15. Vehicle (1, 50) provided with
at least three wheels (7, 7', 13; 53, 54, 89),
a frame comprising a first frame part (3, 51) and a second frame part (4, 52), the frame parts being adapted to tilt with respect to one another about a tilting axis which lies in the longitudinal direction,
at least one front wheel (13, 89) which is connected to the first frame part (3, 51) and can tilt about a front-wheel steering axle (15, 81) which lies essentially parallel to the plane of the front wheel,
a steering wheel (17, 72) which is rotatably connected to the first frame part (3, 51), via a steering axle (18, 71)
tilting means (9, 9'; 55, 56) which are connected to the first and second frame parts (3, 51, 4, 52) for executing a tilting movement between the first and second frame parts, and
a sensor (24; 63, 73, 76, 87) which is coupled to the front wheel (13, 89) and to the tilting means (9, 9'; 55, 56) for forming a control signal for driving the tilting means (9, 9'; 55, 56),
wherein the steering axle (18, 71) can rotate with respect to the front-wheel steering axle (15,81); the sensor (24; 63, 73, 76, 87) determining the angle of rotation between the front-wheel steering axle (15, 81) and the steering axle (18, 71), and
wherein the sensor comprises a rotary shaft (63) which can rotate about its longitudinal direction, which rotary shaft is connected, by means of a part (74) situated in the vicinity of the front wheel (89), to a first end (93) of a first arm (73) which lies transversely with respect to the rotary shaft (63), which first arm (73), at a second end (92), is pivotably connected to a swivel bracket (87) which is pivotably connected to the steering axle (71) and is also pivotably connected to a first end (91) of a second arm (76), which second arm (76) is pivotably connected, by means of its second end (90), to the front-wheel steering axle (81).

16. Vehicle (50) according to claim 15, characterized in that the rotary shaft (63) extends from the first frame part (51) towards the second frame part (52), the tilting means (55, 56) comprising first and second tilting cylinders which, via a valve (62), are connected to a fluid source (67), that end of the rotary shaft (63) which is situated in the vicinity of the second frame part (52) actuating the valve (62) by rotation.

17. Vehicle (50) according to claim 16, characterized in that a closed circuit (130) is formed by the fluid source (67) which is connected, at a high-pressure side, to a supply inlet (101) of the valve (62), which valve is connected, by means of a cylinder outlet (102), via an outgoing line (103), to the first tilting cylinder (55), and by means of a return inlet (109), via a return line (108), is connected to the second tilting cylinder (56), and the valve (62) being connected, by means of a return outlet (110), to a low-pressure side (68) of the pump.

18. Vehicle (50) according to claim 17, characterized in that the valve (62) comprises a slide valve which can be moved between a first and a second limit position and a centre position, in which centre position the supply inlet (101) is connected to the return outlet (110), the outgoing line (103) being connected to a first side of the valve (62) and the return line (108) being connected to a second side, which is situated opposite to the first side, of the valve (62).

19. Vehicle (50) according to claim 17, characterized in that a shock absorber (57, 58) is accommodated in the outgoing line (103) and in the return line (108).

20. Vehicle according to claim 15, further comprising a torsion bar (88) connected at one end to the first frame part (51) and at the other end to the rotary shaft (63).

21. Vehicle (50) according to claim 17, further comprising a power-steering cylinder (82) controlled by a valve (85) for connecting the power-steering cylinder to the closed circuit (130), which valve (85) is provided with a supply inlet (125), which is connected to an upstream part of the closed circuit, with a cylinder outlet (126) and with a return inlet (127) which are connected to respective sides of the power-steering cylinder (82), and with a return outlet (128) which is connected to a downstream part of the closed circuit (130), the valve (85) comprising a slide valve which is connected to the rotary shaft (63) and can be displaced between a first and a second limit position and a centre position, in which centre position the supply inlet (125) is connected to the return outlet (128).

22. Vehicle (50) according to claim 21, characterized in that the cylinder outlet (126) is connected to a first side of the slide valve, the return inlet (127) being connected to a second side, which is situated opposite to the first side, of the slide valve.

23. A vehicle comprising:
at least three wheels;
a frame comprising a first frame part and a second frame part the frame parts being adapted to tilt with respect to one another about a tilting axis which lies in the longitudinal direction;
at least one front wheel which is connected to the first frame part and can tilt about a front-wheel steering axle which lies essentially parallel to a plane of the front wheel;
a steering wheel which is rotatably connected to the first frame part via a steering axle;
tilting means connected to the first and second frame parts for executing a tilting movement between the first and second frame parts;
a sensor coupled to the front wheel and to the tilting means for forming a control signal for driving the tilting means, the steering axle being offset from the front wheel steering axle and being able to rotate with respect to the front wheel steering axle; and
the sensor comprising a linking member pivotably connected to the steering axle and to the front wheel steering axle, a displacement of the linking member being determined by an angle of rotation between the front wheel steering axle and the steering axle and forming the control signal.

* * * * *